April 2, 1935. J. J. DRABIN ET AL 1,996,282

CLUTCH CONTROL

Filed Sept. 15, 1934

JOHN J. DRABIN
SERGE N. KOULICHKOV
INVENTORS

BY John P. Nironow
ATTORNEY

Patented Apr. 2, 1935

1,996,282

UNITED STATES PATENT OFFICE 1,996,282

CLUTCH CONTROL

John J. Drabin and Serge N. Koulichkov,
New York, N. Y.

Application September 15, 1934, Serial No. 744,190

13 Claims. (Cl. 192—.01)

Our invention relates to clutch control and has particular reference to the control of the clutch operating auxiliary motor by the accelerator and brake pedals.

The object of our invention is to provide means for automatically disconnecting the engine clutch when the accelerator pedal is released, and for connecting the clutch when the accelerator pedal is depressed; also to provide means for connecting the clutch by the first portion of the movement of the accelerator pedal before this pedal begins to open the engine throttle valve.

Another object of our invention is to provide means for independent operation of the clutch motor valve by either the accelerator pedal or by the brake pedal. The connections between the valve and the pedals are made for this purpose so that they can become operative only when the corresponding pedal is depressed.

Still another object of our invention is to provide means for disconnecting the connections between the clutch motor valve and the brake pedal when the speed of the automobile falls below a predetermined limit. For this purpose we provide a slidable rod connecting the valve and the brake pedal, and means for moving this rod out of engagement when the speed of the transmission driven shaft falls below a certain low limit.

We also provide means to manually disconnect the automatic operation of the clutch when so desired by the driver of the automobile.

Our invention is more fully described in the accompanying specification and drawing in which—

Figure 1:
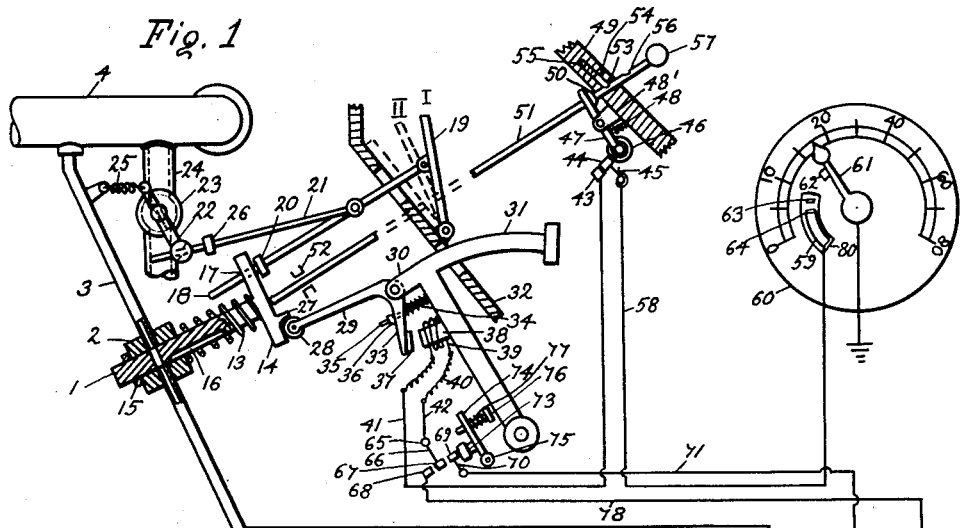
Figure 2:
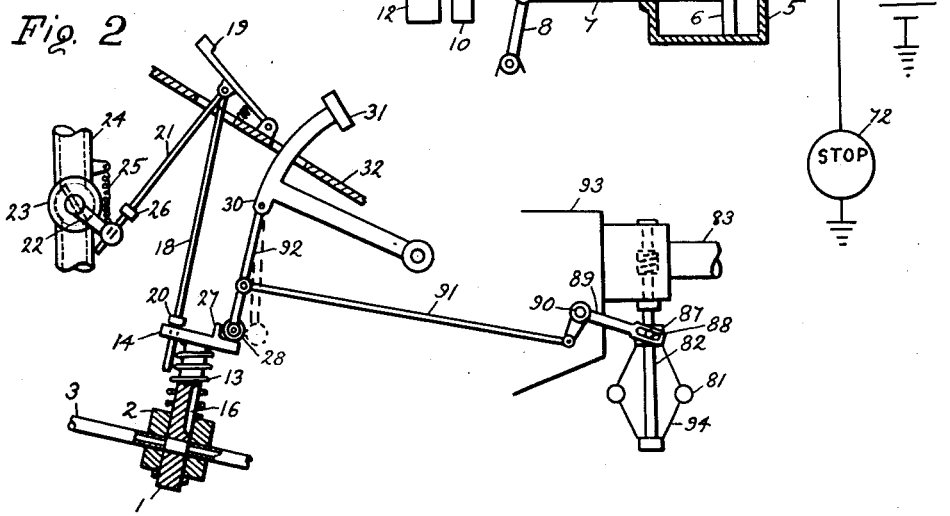
Figure 3:
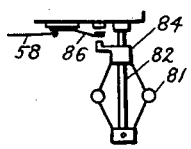
Figure 4:
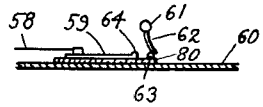

Fig. 1 is a diagrammatic view of the apparatus forming our system of clutch control, Fig. 2 is a modified arrangement, Fig. 3 is a detail view of a modified centrifugal switch, and Fig. 4 is a detail view of the contact points on the speedometer.

Our clutch control arrangement comprises a valve 1 slidably fitted in a valve block 2 placed in a pipe 3 connecting an intake manifold 4 of an automobile engine with a vacuum cylinder 5. The latter has a piston 6 connected by a rod 7 with a lever 8 engaging a bushing 9 of an engine clutch plate 10. A spring 11 tends to press the plate 10 against the face of a flywheel 12 thereby engaging the clutch and connecting the engine with the transmission.

The valve 1 has a retrieving spring 13 pressing against an elongated head 14 and tending to keep the valve open, a bushing 15 limiting the movement of the valve under action of the spring. A bleeder slot 16 is provided in the valve for connecting the inside of the cylinder 5 with the outside air when the valve is closed. The T-shaped head of the valve has a hole 17 at one side in which slides a rod 18 pivotally connected with an accelerator pedal 19. A bushing 20 on the rod engages the head and pushes the valve down into a closed position when the accelerator pedal is depressed. A rod 21 is pivotally connected with the rod 18 at one end and slides in the end of a lever 22 operating a throttle valve 23 in a carburetor pipe 24. A retrieving spring 25 tends to keep the valve 23 closed, in which position only enough of the fuel mixture is admitted to the engine to keep it slowly going or idling. The rod 21 has a bushing 26 placed at a certain distance away from the end of the lever 22, so that the accelerator pedal does not begin to open the valve 23 until it has been moved into a position II shown with dotted lines in Fig. 1, in which position the valve 1 is closed.

The other side of the head 14 has a lug 27 forming a seat for a roller 28 on the end of a lever 29. The latter is pivoted by its middle portions in a lug 30 on the brake pedal 31 passing through the floor board 32 of the automobile. The other end 33 of the lever is engaged by a compression spring 34 on a rod 35 passing through a hole in the lever and provided with a bushing or enlargement 36 limiting the outward movement of the lever. An iron armature 37 is supported on the end of the lever opposite a magnet core 38 mounted on the brake pedal. A coil 39 is placed on the core and is connected by flexible leads 40 with leads 41 and 42. The lead 41 is connected with a contact block 43 engaged by a second contact block 44 mounted on a resilient arm 45 which tends to move the block 44 away from the block 43. An insulation roller 46 on the end of a lever 47 engages the block 44, being pressed against it by a compression spring 48. The lever 47 is pivoted in a bracket 48' supported on the under side of the dashboard 49. The other end of the lever 47 engages a bushing 50 on a rod 51 slidably supported in the dashboard and in a bearing 52. The rod 51 has a notch 53 engaged by a sliding pin 54 with rounded end fitting the notch 53. A spring 55 presses the pin against the notch. In this position the other end of the rod 51 touches the head 14 of the valve 1 when the latter is open. A second notch 56 is provided on the rod 51 for a closed position of the valve. A knob or handle 57 on the end of the rod 51 is provided for moving the rod by hand. The block 44 through its arm 45 is connected by a lead 58 with a contact plate 59 on the dial 60 of a speedometer. The plate 59 reaches a point on the dial where the speed indicating hand 61 reaches when the speed of the automobile drops to a certain low limit beyond which there is a danger of the engine being stalled.

The hand 61 is grounded to the frame or chassis of the automobile. It has a resilient contact lip 62 sliding over the dial. The latter is provided with a button or projection 63 in front of the end of the plate 59 which also has a projection 64. The object of these projections is to cause the lip 62 to snap between the on and off positions thereby avoiding burning of the contact points. These projections are shown in detail in Fig. 4.

The lead 42 is connected to a post 65 supporting a resilient arm 66 with a contact block 67 on the end. This block is located between stationary contact block 68 and a movable contact block 69 supported on the end of a resilient arm 70. The latter is connected by a lead 71 with the lamp of a "stop" signal 72, the other terminal of the lamp being grounded. The block 69 is engaged by an insulation block 73 on a lever 74 rotatively mounted on a pivot 75 and adapted to be engaged by the pedal 31 through a sliding rod 76 with a spring 77. The stationary block 68 is connected by a lead 78 with a storage battery 79 the other terminal of which is grounded.

The operation of our system is as follows.

The normal position of the valve 1 is open, so that with the engine running there is vacuum in the right side of the cylinder 5. The atmospheric pressure on the piston 6 will move it to the right as shown in Fig. 1 thereby disconnecting the engine clutch plate 10 from the flywheel 12. In this position of the clutch the transmission gears can be shifted for starting the car forward or into the reverse. The car will not move, however, until the clutch is connected, and this can happen only if the valve 1 is closed and the air is admitted into the cylinder 5 through the bleeder slot 16 and pipe 3. An exhaust port 96 is provided in the cylinder 5.

The bushing 20 on the rod 18 is placed so that the valve 1 becomes closed and the bleeder slot 16 connected with the pipe 3 during the first portion of the movement of the accelerator pedal, between positions I and II, Fig. 1. The valve then remains closed for the rest of the movement of the pedal 19. Due to the arrangement of the bushing 26 at a distance from the lever 22, however, the throttle valve 23 does not begin to be opened until the accelerator pedal reaches the position II. The spring 25 may be made sufficiently strong in comparison with the spring 19 so that the driver will readily feel the difference in the resistance of the pedal after it has reached the position II when the resistance of the spring 25 adds to that of the spring 19. The engine is still idling for all accelerator pedal positions between points I and II. This arrangement is provided in order to enable the driver to use the engine as a brake in going down hill, and it is only necessary for that purpose to slightly depress the accelerator pedal until the vacuum cylinder or motor 5 begins to be released thereby permitting the spring 11 to engage the clutch.

The same result is accomplished by operating the brake pedal 31, which also closes the valve 1 through the lever 29. The accelerator pedal need not be touched then as the action of the brake pedal alone will cause the clutch to be engaged. The head 14 will then slide over the extension of the rod 18 without moving the accelerator pedal. The stop light 72 becomes connected with the battery 79 as soon as the brake pedal closes the switch formed by the lever 74, resilient arm 70, and the contact points 68, 69 and 67, the latter being on the resilient arm 66. Incidentally this switch will also close the circuit up to the plate 59 through the switch formed of the contact blocks 43 and 44 which are kept closed by the roller 46 of the arm 47 under action of the spring 48.

The engine will act as a brake until the speed of the automobile falls below a certain limit when there is a danger that the engine might become stalled. The contact plate 59 is set for this point. It may be mounted on an insulation board 80 which can be fastened with suitable screws to the face of the dial 60 and can be placed in different positions for different low speed limits. A thin silver brush may be used instead of the contact strip 62.

As soon as the contact strip 62 snaps from the ridge 63 on the plate 59, the magnet 38 will become energized, provided the switch 66 is closed by the brake pedal. The armature 37 will be attracted, turning the lever 29 and disengaging the roller 28 from the bar 14. The valve 1, being thereby released, will return to its open position under action of the retrieving spring 13. The engine will be free from the transmission with the clutch released, and will continue running at the idling speed, although the automobile will be slowed down to the complete stop if desired.

The automatic clutch-disconnecting feature can be disconnected by the driver by merely pushing down on the handle 57 until the notch 56 becomes engaged by the locking pin 54. The rod 51 will then depress the valve 1 closing it, while the switch 45 will be opened by the spring on the switch arm, so that no current will flow into the magnet coil.

Instead of using speedometer for closing the circuit for the magnet coil, a special centrifugal governor may be employed consisting of weights 81 on a shaft 82 (Figs. 2 and 3) driven by the shaft 83 connecting the transmission with the rear wheels of the automobile. A sliding bushing 84 of the governor closes a switch 86 connected with the lead 58 thereby grounding it and completing the circuit for the magnet coil.

Another modification is shown in Fig. 2. Here the governor weights 81 are connected to a sliding bushing 87 having pins or trunnions 88 engaging the end of a lever 89. The latter is pivotally mounted on a pin 90 supported on the side of the transmission housing 93. The other end of the lever is pivotally connected with a rod 91 connected at the other end with a rod 92. This rod is pivoted at one end in the lug 30 on the brake pedal 31, the other end having a roller 28 engaging the end of the valve head 14. The governor springs 94 become straightened out along the shaft 82, pushing the bushing 87 up and turning the lever 89, thereby pulling out the rod 92 and disconnecting the brake pedal from the valve 1.

It is understood that the construction of individual elements used in our system can be modified without departing from the spirit of our invention.

Important advantages of our system of clutch control are that it eliminates the use of the clutch pedal, the clutch being automatically disengaged every time the accelerator pedal is released, permitting the ordinary gear shifting operations while the engine is idling, and also permitting the automobile to coast down hill with the engine disconnected and idling; the engine, however, can be made to act as a brake in going down hill by merely depressing the accelerator pedal through the first portion of its travel, thereby closing the valve for the clutch motor and engaging the clutch, without increasing the engine speed. In order to use the engine as a brake at very slow speeds, for instance, when second or first gears are used, it is only necessary to disconnect the automatic control by pushing on the handle 57. Another advantage is that the engine is used as a brake whenever the brake pedal is depressed, but only until the automobile speed reaches a certain low limit of speed, when the engine becomes automatically disconnected so as to prevent its being stalled. The automobile may then be brought to a complete stop, the engine continuing to run at the idling speed.

We claim as our invention:

1. A clutch control for an automobile having an engine clutch, a vacuum motor for said clutch, an accelerator pedal and a brake pedal, in combination a pipe connecting said motor with the source of vacuum suction on said engine, a valve in said pipe, a retrieving spring for opening said valve thereby rendering said motor operative for disconnecting said clutch, operative connections between said valve and said pedals, said connections being adapted to be operative only when either of said pedals is depressed, said valve being thereby adapted to be closed independently by either of said pedals, and means to render said brake pedal connections inoperative when the speed of said automobile falls below a predetermined limit.

2. A clutch control for an automobile having an engine clutch, a vacuum motor for said clutch, an accelerator pedal and a brake pedal, in combination a pipe connecting said motor with the source of vacuum suction on said engine, a valve in said pipe, a retrieving spring for said valve adapted to open it thereby rendering said motor operative for disconnecting said clutch, operative connections between said valve and said pedals, said connections being adapted to be operative only when either of said pedals is being depressed, said valve being thereby adapted to be independently closed by either of said pedals, and means to render said brake pedal connections inoperative when the speed of said automobile falls below a predetermined limit, said accelerator pedal being adapted to close said valve before opening the throttle valve of said engine.

3. A clutch control for an automobile having an engine clutch, a vacuum motor for disconnecting said clutch, and accelerator pedal, a brake pedal, and a speedometer, in combination a pipe connecting said motor with the intake manifold of said engine, a valve in said pipe, a retrieving spring for opening said valve, operative connections between said valve and said accelerator pedal, operative connections between said valve and said brake pedal, said accelerator and brake pedal connections being operative only when said pedals are being depressed, said valve being thereby adapted to be independently closed by either of said pedals, an electromagnetic means for rendering said brake pedal connections inoperative, and contact points on said speedometer adapted to close the electric circuit for said electromagnetic means when said speedometer indicates a predetermined slow speed of said automobile.

4. A clutch control for an automobile having an engine clutch, a vacuum motor for disconnecting said clutch, an accelerator pedal, a brake pedal, and a speedometer, in combination a pipe connecting said motor with the engine intake manifold, a valve in said pipe, a retrieving spring for opening said valve, connections between said valve and said accelerator pedal, said connections being adapted to be operative only when accelerator pedal is being depressed, a pivoted lever connecting said brake pedal with said valve and adapted to form an operative connection only when said brake pedal is being depressed, an electromagnetic means for moving said lever out of engagement with said valve, and means to render said electromagnetic means operative when the speed of said automobile falls below a predetermined low limit.

5. A clutch control for an automobile having an engine clutch, a vacuum motor for disconnecting said clutch, and a brake pedal, in combination a pipe connecting said motor with the intake manifold of said engine, a valve in said pipe, a retrieving spring for opening said valve, connections between said valve and said pedal, said connections being adapted to be operative only when said pedal is depressed, an electromagnetic means for rendering said connections inoperative regardless of the position of said pedal, and means to render said electromagnetic means operative when the speed of said automobile falls below a predetermined low limit.

6. A clutch control for an automobile having an engine clutch, an air motor for disconnecting said clutch, a pipe connecting said motor with said engine, and a brake pedal, in combination a valve in said pipe, a retrieving means for opening said valve, a rod connecting said valve with said pedal and adapted to form an operative connection only when said pedal is depressed, said rod being adapted to be moved sideways thereby disconnecting said valve from said pedal, an electromagnetic means for moving said rod sideways, and means to render said electromagnetic means operative when the speed of said automobile falls below a predetermined low limit.

7. A clutch control for an automobile having an engine clutch, an air motor for disconnecting said clutch, a pipe connecting said motor with said engine, a brake pedal, and a speedometer, in combination a valve in said pipe, a retrieving means for opening said valve, means to close said valve by said pedal, an electromagnetic means for rendering said closing means inoperative, and electrical contact points on said speedometer for rendering said electromagnetic means operative when the speed of said automobile falls below a predetermined low limit.

8. A clutch control for an automobile having an engine clutch, an air motor for disconnecting said clutch, a pipe connecting said motor with said engine, a brake pedal, and a speedometer, in combination a valve in said pipe, a retrieving means for opening said valve, means to close said valve by said pedal, an electromagnetic means for rendering said closing means inoperative, electrical contact points on said speedometer for rendering said electromagnetic means operative when the speed of the automobile falls below a predetermined low limit, and means to prevent sparking at said contact points.

9. A clutch control for an automobile having an engine clutch, an air motor for disconnecting said clutch, a pipe connecting said air motor with said engine, a brake pedal, and an accelerator pedal, in combination a valve in said pipe, a resilient means for opening said valve, means to close said valve by said accelerator pedal, means to close said valve by said brake pedal, and means to manually close said valve, all said closing means being adapted to act independently from each other.

10. A clutch control for an automobile having an engine clutch, an air motor for disconnecting said clutch, a pipe connecting said motor with said engine, a brake pedal, and an accelerator pedal, in combination, a valve in said pipe, a retrieving spring for opening said valve, means to close said valve by said accelerator pedal, means to close said valve by said brake pedal, means to manually close said valve thereby rendering said valve connections to the pedals inoperative, and means to yieldingly lock said manual means in its operative position.

11. A clutch control for an automobile having an engine clutch, an air motor for disconnecting said clutch, a pipe connecting said motor with the engine, and a brake pedal, in combination, a valve in said pipe, means to close said valve by said brake pedal thereby rendering said air motor inoperative, an electromagnetic means for rendering said closing means inoperative, a centrifugal device for rendering said electromagnetic means operative when the speed of said automobile falls below a predetermined low limit, and a manual means for rendering said electromagnetic means inoperative regardless of the speed of said automobile.

12. A clutch control for an automobile having an engine clutch, an air motor for disconnecting said clutch, a pipe connecting said motor with the engine of said automobile, and a brake pedal, in combination, a valve in said pipe, a retrieving spring for opening said valve thereby rendering said clutch motor operative, a connecting member between said pedal and said valve adapted to close said valve when said pedal is depressed, an electromagnetic means for rendering said connecting member inoperative, a centrifugal device operated by the driven shaft of the transmission of said automobile and adapted to render said electromagnetic device operative when the speed of said automobile falls below a predetermined low limit, and a manual means for closing said valve and for rendering said electromagnetic means inoperative.

13. A clutch control for an automobile having an engine clutch, an air motor for disconnecting said clutch, a pipe connecting said motor with the engine, a throttle valve on the intake manifold of said engine, and an accelerator pedal, in combination, a valve in said pipe, a spring for opening said valve, a rod operatively connecting said pedal with said valve and adapted to close said pipe valve with the first portion of the movement of said pedal, a rod operatively connecting said pedal with said throttle valve and adapted to begin to open said throttle valve during the second portion of the movement of said pedal, and a manual means for closing said pipe valve.

JOHN J. DRABIN.
SERGE N. KOULICHKOV.